US011603132B2

(12) United States Patent
Suzuki

(10) Patent No.: US 11,603,132 B2
(45) Date of Patent: Mar. 14, 2023

(54) STEERING CONTROL METHOD AND STEERING CONTROL DEVICE

(71) Applicant: NISSAN MOTOR CO., LTD., Yokohama (JP)

(72) Inventor: Taku Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/610,756

(22) PCT Filed: May 15, 2019

(86) PCT No.: PCT/JP2019/019397
§ 371 (c)(1),
(2) Date: Nov. 12, 2021

(87) PCT Pub. No.: WO2020/230307
PCT Pub. Date: Nov. 19, 2020

(65) Prior Publication Data
US 2022/0227416 A1    Jul. 21, 2022

(51) Int. Cl.
*B62D 6/00* (2006.01)
*B62D 15/02* (2006.01)
(52) U.S. Cl.
CPC ........... *B62D 15/025* (2013.01); *B62D 6/002* (2013.01); *B62D 6/008* (2013.01)
(58) Field of Classification Search
CPC ................................ B62D 6/002; B62D 6/008
See application file for complete search history.

(56) References Cited

U.S. PATENT DOCUMENTS

| 2021/0206426 | A1* | 7/2021 | Kitazume | ............ B62D 5/0409 |
| 2021/0309292 | A1* | 10/2021 | Suzuki | ............ B62D 6/008 |
| 2022/0041210 | A1* | 2/2022 | Sakaguchi | ............ B62D 6/002 |

FOREIGN PATENT DOCUMENTS

| JP | 2009-51492 A | 3/2009 |
| JP | 2017-202772 A | 11/2017 |
| JP | 2018-47885 A | 3/2018 |
| WO | WO 2007/137287 A2 | 11/2007 |
| WO | WO-2014/115234 A1 | 7/2014 |

* cited by examiner

*Primary Examiner* — Ryan Rink
(74) *Attorney, Agent, or Firm* — Foley & Lardner LLP

(57) ABSTRACT

A steering control method for a vehicle including a steer-by-wire type wheel-turning mechanism in which a steering wheel and steered wheels are mechanically disconnected, the method including: detecting an actual steering angle of the steering wheel; calculating a target steering angle of the steering wheel on a basis of a target wheel-turning angle of the steered wheels; applying a steering reaction force to the steering wheel according to an angle deviation between the actual steering angle and the target steering angle; detecting a steering operation of the steering wheel by a driver; and when the steering operation by the driver is detected, reducing the steering reaction force according to the angle deviation compared with when the steering operation by the driver is not detected.

5 Claims, 12 Drawing Sheets

STEERING CONTROL METHOD AND STEERING CONTROL DEVICE

TECHNICAL FIELD

The present invention relates to a steering control method and a steering control device.

BACKGROUND ART

PTL 1 describes a steering control device that, in a vehicle provided with a steer-by-wire type wheel-turning mechanism in which a steering wheel and steered wheels are mechanically disconnected, calculates a target wheel-turning angle of the steered wheels for keeping a lane and applies a steering reaction force so that a steering angle of the steering wheel corresponding to the target wheel-turning angle is in a neutral position of the steering wheel.

CITATION LIST

Patent Literature

PTL 1: WO 2007/137287

SUMMARY OF INVENTION

Technical Problem

However, when the steering reaction force is applied so that the steering angle corresponding to the target wheel-turning angle of travel assist control is in the neutral position, it may be difficult to balance the travel assist control and a steering operation by a driver.

It is an object of the present invention to facilitate a driver's steering operation during travel assist control for applying a steering reaction force that causes a wheel-turning angle of steered wheels to follow a target wheel-turning angle.

Solution to Problem

According to an aspect of the present invention, there is provided a steering control method for a vehicle including a steer-by-wire type wheel-turning mechanism in which a steering wheel and steered wheels are mechanically disconnected. The steering control method includes: detecting an actual steering angle of the steering wheel; calculating a target steering angle of the steering wheel on a basis of a target wheel-turning angle of the steered wheels; applying a steering reaction force to the steering wheel according to an angle deviation between the actual steering angle and the target steering angle; detecting a steering operation of the steering wheel by a driver; and when the steering operation by the driver is detected, reducing the steering reaction force according to the angle deviation compared with when the steering operation by the driver is not detected.

Advantageous Effects of Invention

According to the aspect of the present invention, it is possible to facilitate a driver's steering operation while ensuring the followability of a wheel-turning angle of steered wheels to a target wheel-turning during travel assist control for applying a steering reaction force that causes the wheel-turning angle of the steered wheels to follow the target wheel-turning angle and to balance the travel assist control and a steering operation by a driver.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Hereinafter, embodiments of the present invention will be described with reference to the drawings.

(Configuration)

Figure 1:
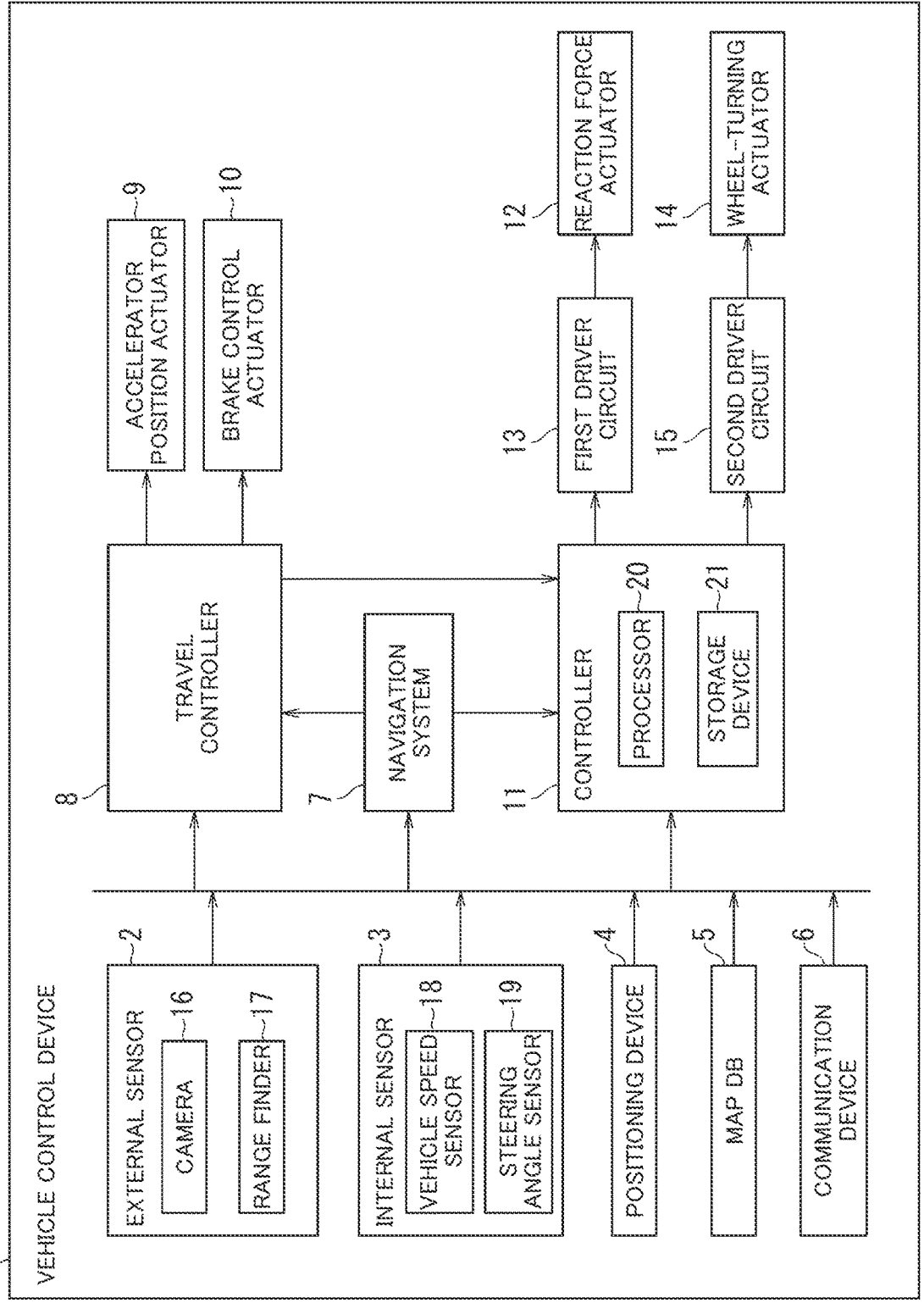
FIG. 1 is a schematic configuration diagram of one example of a vehicle control device of an embodiment.

Refer to FIG. 1. A vehicle mounted with a vehicle control device 1 (hereinafter referred to as "host vehicle") includes a steer-by-wire type wheel-turning mechanism in which a steering wheel and steered wheels are mechanically disconnected. The vehicle control device 1 controls a wheel-turning angle of the steered wheels and a steering reaction force to be applied to the steering wheel.

Additionally, the vehicle control device 1 performs travel assist control that assists travel of the host vehicle. The travel assist control includes automatic driving control that automatically drives the host vehicle without a driver's involvement on the basis of travel environment around the host vehicle and driving assist control that assists driving of the host vehicle by the driver.

For example, the driving assist control includes steering assist control, such as lane keeping control, preceding vehicle follow-up control for traveling along a travel trajectory of a preceding vehicle, and steering support control for supporting steering for avoiding obstacles.

The vehicle control device 1 includes an external sensor 2, an internal sensor 3, a positioning device 4, a map database 5, a communication device 6, a navigation system 7, a travel controller 8, an accelerator position actuator 9, a brake control actuator 10, a controller 11, a reaction force actuator 12, a first driver circuit 13, a wheel-turning actuator 14, and a second driver circuit 15. In the attached drawings, the map database is denoted as "MAP DB".

The external sensor 2 is, for example, a sensor that detects a surrounding environment of the host vehicle, for example, objects around the host vehicle. The external sensor 2 may include, for example, a camera 16 and a range finder 17.

The camera 16 and the range finder 17 detect the surrounding environment of the host vehicle, such as objects present around the host vehicle (for example, other vehicles, pedestrians, white lines such as lane boundary lines and lane markings, and features such as traffic signals, stop lines, signs, buildings, utility poles, curbs, and crosswalks provided on roads or near the roads), relative positions of the objects with respect to the host vehicle, and relative distances between the host vehicle and the objects.

The camera 16 may be, for example, a stereo camera. The camera 16 may be a monocular camera, in which the same object may be photographed from a plurality of viewpoints by the monocular camera, and a distance to the object may be calculated. Additionally, the distance to the object may be calculated on a basis of a ground contact position of the object detected from an image captured by the monocular camera.

The range finder 17 may be, for example, a laser rangefinder (LRF), a radar unit, or a laser scanner unit.

The camera 16 and the range finder 17 output surrounding environment information, which is information about the detected surrounding environment, to the navigation system 7, the travel controller 8, and the controller 11.

The internal sensor 3 is a sensor that detects a traveling state of the host vehicle. The internal sensor 3 may include, for example, a vehicle speed sensor 18 and a steering angle sensor 19.

The vehicle speed sensor 18 detects a vehicle speed V of the host vehicle. The steering angle sensor 19 detects a column shaft rotation angle, i.e., an actual steering angle θs of the steering wheel (a steering handle angle).

The internal sensor 3 may include, for example, an acceleration sensor that detects acceleration generated at the host vehicle and a gyro sensor that detects an angular velocity of the host vehicle.

The internal sensor 3 outputs traveling state information, which is information about the detected traveling state, to the navigation system 7, the travel controller 8, and the controller 11.

The positioning device 4 receives radio waves from a plurality of navigation satellites to acquire a current position of the host vehicle, and outputs the acquired current position of the host vehicle to the navigation system 7 and the travel controller 8. The positioning device 4 may include, for example, a global positioning system (GPS) receiver or another global positioning system (global navigation satellite system: GNSS) receiver other than the GPS receiver.

The map database 5 stores road map data.

The road map data includes shapes (lane shapes) and coordinate information about white lines such as lane boundary lines and lane markings, altitudes of roads and the white lines, and coordinate information about features such as traffic signals, stop lines, signs, buildings, utility poles, curbs, and crosswalks provided on roads or near the roads.

The road map data may further include information about road types, road slopes, the numbers of lanes, speed limits (legal speeds), road widths, the presence or absence of merging points, and the like. The road types may include, for example, general roads and highways.

The map database 5 is referenced by the navigation system 7 and the travel controller 8.

The communication device 6 performs wireless communication with a communication device outside the host vehicle. A communication system by the communication device 6 may be, for example, wireless communication via a public mobile phone network, vehicle-to-vehicle communication, road-to-vehicle communication, or satellite communication.

The navigation system 7, the travel controller 8, and the controller 11 may acquire road map data by the communication device 6 from an external information processing device in place of or in addition to the map database 5.

The navigation system 7 provides a route guidance to a destination set on a map by the driver of the host vehicle to occupant(s) of the host vehicle. The navigation system 7 uses the various kinds of information input from the external sensor 2, the internal sensor 3, and the positioning device 4 to estimate the current position of the host vehicle, generates a route to the destination, and provides the route guidance to the occupant(s). The navigation system 7 outputs the route information to the travel controller 8.

The travel controller 8 performs the travel assist control of the host vehicle. As described above, the travel assist control includes the automatic driving control for automatically driving the host vehicle without the driver's involvement and the driving assist control for assisting driving of the host vehicle by the driver.

For example, in the automatic driving control, the travel controller 8 sets a target travel trajectory along which the host vehicle should travel on a lane where the host vehicle is traveling on the basis of the route information output from the navigation system 7, the surrounding environment, such as the objects around the host vehicle and the lane boundary line, detected by the external sensor 2, the road map data of the map database 5, and the traveling state of the host vehicle detected by the internal sensor 3.

Additionally, for example, in the driving assist control, the travel controller 8 sets a target travel trajectory along which the host vehicle should travel on a lane where the host vehicle is traveling on the basis of a positioning result by the positioning device 4, the surrounding environment detected by the external sensor 2, the road map data of the map database 5, and the traveling state of the host vehicle detected by the internal sensor 3.

The travel controller 8 drives the accelerator position actuator 9 and the brake control actuator 10 to control driving force and braking force of the host vehicle so that the host vehicle travels along the target travel trajectory.

The accelerator position actuator 9 controls an accelerator position of the host vehicle. The brake control actuator 10 controls a braking action of a brake system of the host vehicle.

In addition, in the travel assist control including automatic steering control, the travel controller 8 calculates a target wheel-turning angle, which is a target value of a wheel-turning angle (tire angle) of the steered wheels for causing the host vehicle to travel along the target travel trajectory. The travel controller 8 calculates a target steering angle $θt$ of the steering wheel corresponding to the target wheel-turning angle. The travel controller 8 outputs the target steering angle $θt$ to the controller 11.

The controller 11 is an electronic control unit (ECU) that performs wheel-turning control of the steered wheels and reaction force control of the steering wheel. In the present specification, the "reaction force control" refers to control of a steering torque applied to the steering wheel by the actuator. Additionally, the steering torque applied to the steering wheel by the reaction force control may also be referred to as steering reaction force torque.

The controller 11 includes a processor 20 and a peripheral component such as a storage device 21. The processor 20 may be, for example, a central processing unit (CPU) or a micro-processing unit (MPU).

The controller 11 may be an electronic control unit integrated with the travel controller 8 or may be a separate electronic control unit.

The storage device 21 may include a semiconductor storage device, a magnetic storage device, and an optical storage device. The storage device 21 may include memories, such as register, cache memory, and read only memory (ROM) and random access memory (RAM) used as primary storage devices.

Note that the controller 11 may be realized by a functional logic circuit set in a general-purpose semiconductor integrated circuit. For example, the controller 11 may include a programmable logic device (PLD), such as a field-programmable gate array (FPGA), or the like.

The controller 11 calculates a command steering torque Tr, which is a command value of the steering reaction force torque (a rotation torque applied to the steering wheel and may hereinafter also be referred to as steering torque) applied to the steering wheel according to the actual steering angle $θs$ of the steering wheel, the vehicle speed V, and the target steering angle $θt$ determined by the travel controller 8. Note that if the vehicle speed is the same, the controller 11 calculates a command steering torque Tr that is larger as a deviation between the target steering angle $θt$ and the actual steering angle $θs$ is larger. Additionally, the command steering torque Tr is a steering torque that is applied to the steering wheel in a direction in which the actual steering angle $θs$ matches the target steering angle $θt$.

The controller 11 outputs a control signal that causes the reaction force actuator 12 to generate the command steering torque Tr to the first driver circuit 13 and drives the reaction force actuator 12 to apply the calculated steering reaction force torque to the steering wheel.

The controller 11 calculates a command wheel-turning angle, which is a command value of the wheel-turning angle of the steered wheels, according to the actual steering angle $θs$ of the steering wheel detected by the steering angle sensor 19.

The controller 11 outputs the calculated command wheel-turning angle to the second driver circuit 15, and drives the wheel-turning actuator 14 so that an actual wheel-turning angle of the steered wheels becomes the command wheel-turning angle.

Figure 2:
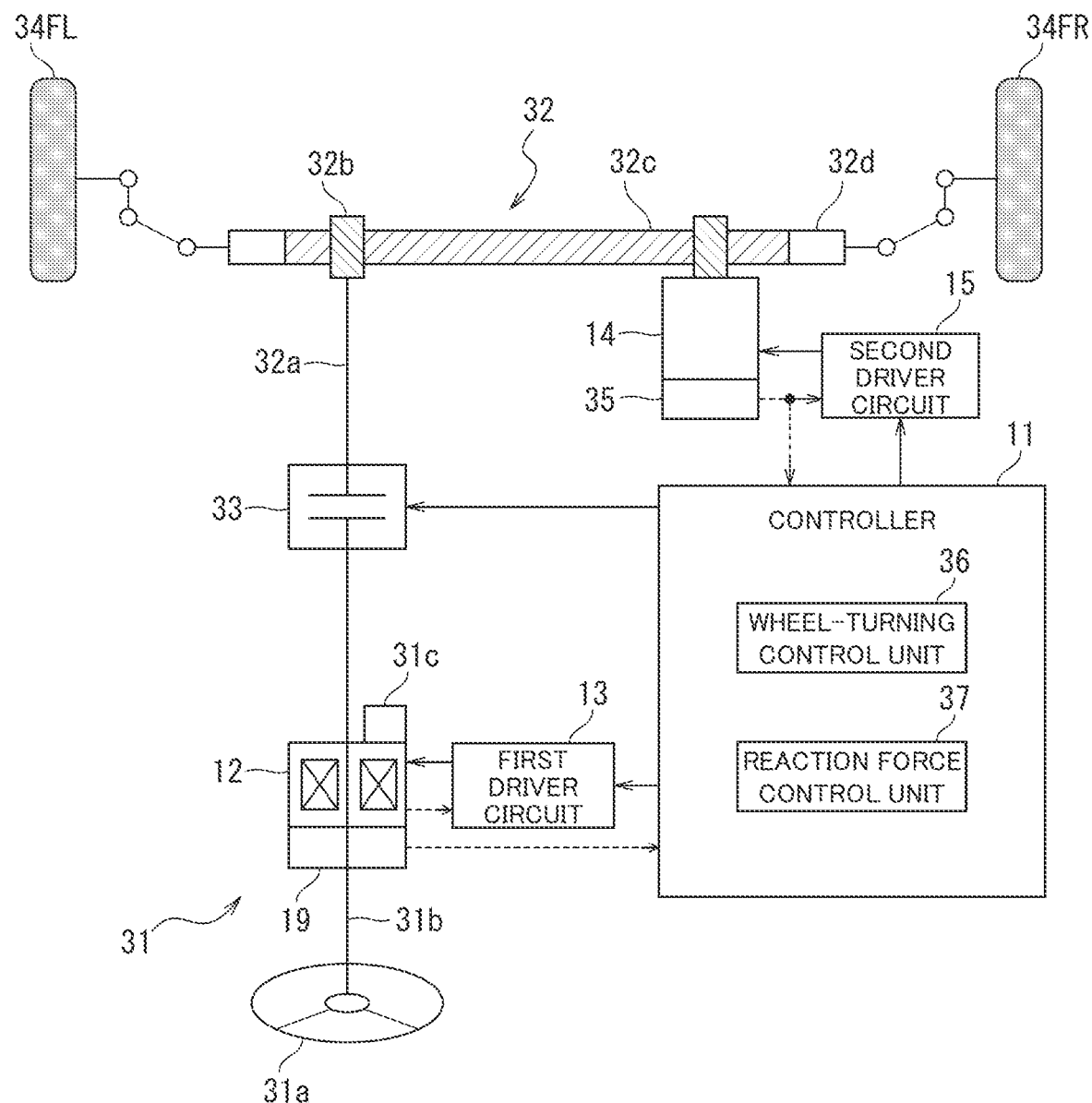
FIG. 2 is a schematic configuration diagram of one example of a steering system of a vehicle mounted with the vehicle control device.

A steering system of the host vehicle will be described with reference to FIG. 2. The host vehicle includes a steering unit 31, a wheel-turning unit 32, and a backup clutch 33. When the backup clutch 33 is released, the steering unit 31 that receives a steering input from a driver and the wheel-turning unit 32 that turns left and right front wheels 34FL and 34FR, which are the steered wheels, are mechanically disconnected.

The steering unit 31 includes a steering wheel 31a, a column shaft 31b, a current sensor 31c, the reaction force actuator 12, the first driver circuit 13, and the steering angle sensor 19.

The wheel-turning unit 32 includes a pinion shaft 32a, a steering gear 32b, a rack gear 32c, a steering rack 32d, the wheel-turning actuator 14, the second driver circuit 15, and a wheel-turning angle sensor 35.

The controller 11 also includes a wheel-turning control unit 36 that determines the command wheel-turning angle according to the actual steering angle $θs$ of the steering wheel 31a and a reaction force control unit 37 that determines the command steering torque Tr according to the actual steering angle $θs$, the vehicle speed V, and the target steering angle $θt$ determined by the travel controller 8.

Functions of the wheel-turning control unit 36 and the reaction force control unit 37 may be realized, for example, by allowing the processor 20 to execute a computer program stored in the storage device 21 of the controller 11.

The reaction force actuator 12, the first driver circuit 13, and the controller 11 form a steering control device.

The steering wheel 31a of the steering unit 31 rotates by the steering reaction force torque applied by the reaction force actuator 12, and also rotates by receiving input of a steering torque applied by the driver.

The column shaft 31b rotates integrally with the steering wheel 31a.

The reaction force actuator 12 may be, for example, an electric motor. The reaction force actuator 12 includes an output shaft located on the same axis as the column shaft 31b.

The reaction force actuator 12 outputs a rotation torque to be applied to the steering wheel 31a to the column shaft 31b in response to a command current output from the first driver circuit 13. Applying the rotation torque generates the steering reaction force torque in the steering wheel 31a.

The first driver circuit 13 controls the command current to be output to the reaction force actuator 12 by torque feedback that matches an actual steering reaction force torque estimated from a drive current of the reaction force actuator 12 detected by the current sensor 31c with the command steering torque Tr indicated by a control signal output from the reaction force control unit 37.

The steering angle sensor 19 detects a rotation angle of the column shaft 31b, i.e., the actual steering angle θs of the steering wheel 31a.

On the other hand, the steering gear 32b of the wheel-turning unit 32 turns the left and right front wheels 34FL and 34FR in response to rotation of the pinion shaft 32a. As the steering gear 32b, for example, a rack and pinion type steering gear or the like may be employed.

The wheel-turning actuator 14 may be, for example, an electric motor such as a brushless motor. An output shaft of the wheel-turning actuator 14 is connected to the rack gear 32c via a decelerator.

The wheel-turning actuator 14 outputs a wheel-turning torque for turning the left and right front wheels 34FL and 34FR to the steering rack 32d in response to a command current output from the second driver circuit 15.

The wheel-turning angle sensor 35 detects a rotation angle of the output shaft of the wheel-turning actuator 14, and detects the wheel-turning angle of the left and right front wheels 34FL and 34FR on the basis of the detected rotation angle.

The second driver circuit 15 controls the command current to the wheel-turning actuator 14 by angle feedback that matches an actual wheel-turning angle detected by the wheel-turning angle sensor 35 with a command wheel-turning angle indicated by a control signal from the wheel-turning control unit 36.

The backup clutch 33 is provided between the column shaft 31b and the pinion shaft 32a. Then, when the backup clutch 33 is released, the steering unit 31 and the wheel-turning unit 32 are mechanically disconnected, and when it is engaged, the steering unit 31 and the wheel-turning unit 32 are mechanically connected.

Next, a description will be given of the command steering torque Tr (i.e., the steering reaction force torque) determined by the reaction force control unit 37.

The reaction force control unit 37 calculates a first steering reaction force torque Tr1 and a second steering reaction force torque Tr2, and then sums the first and second steering reaction force torques Tr1 and Tr2 to calculate the command steering torque Tr=Tr1+Tr2.

The first steering reaction force torque Tr1 will be described. In the steer-by-wire type wheel-turning mechanism, the steering wheel 31a and the steered wheels are mechanically disconnected. Due to this, a tire lateral force that acts on the steered wheels is not transmitted to the steering wheel 31a, which thus generates no restoring torque (for example, a self-aligning torque) that tries to return the steering wheel 31a to a neutral position (a position at a steering angle when traveling straight ahead, which is a position at a steering angle of 0°).

Therefore, the reaction force control unit 37 calculates the first steering reaction force torque Tr1 as the restoring torque that causes the steering wheel 31a to return to the neutral position.

Figure 3A:
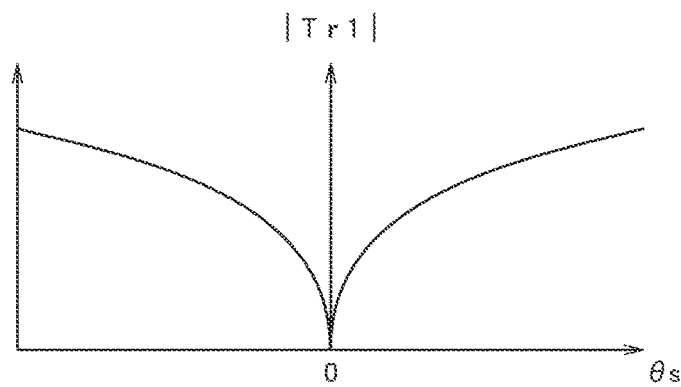
FIG. 3A is an illustrative diagram of a first steering reaction force torque Tr1 when automatic steering control is not performed.

For example, the reaction force control unit 37 calculates the first steering reaction force torque Tr1 that has characteristics illustrated in FIG. 3A. For example, the reaction force control unit 37 may calculate a steering reaction force based on the actual steering angle θs and the vehicle speed V as the first steering reaction force torque Tr1.

This allows the driver to feel the steering reaction force according to the tire lateral force, so that the steering feeling of the steer-by-wire type wheel-turning mechanism is improved.

Figure 3B:
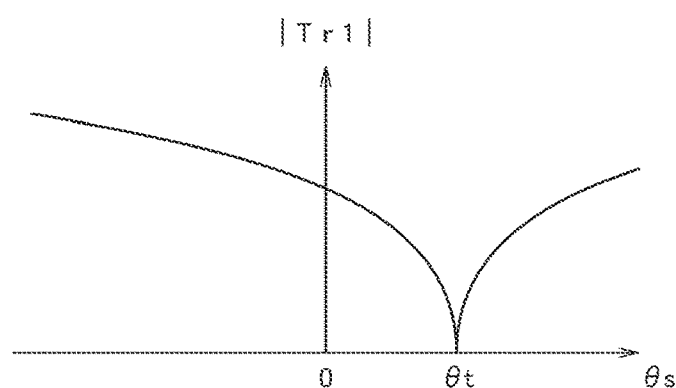
FIG. 3B is an illustrative diagram of the first steering reaction force torque Tr1 during the automatic steering control.

On the other hand, during the automatic steering control, the reaction force control unit 37 offsets the actual steering angle θs by the target steering angle θt to calculate the first steering reaction force torque Tr1. Then, the characteristics of the first steering reaction force torque Tr1 become as illustrated in FIG. 3B, and a steering reaction force torque according to an angle deviation (θt−θs) between the actual steering angle θs and the target steering angle θt is calculated.

As a result, the first steering reaction force torque Tr1 works so that the target steering angle θt is in the neutral position of the steering wheel 31a. Specifically, for example, suppose that, with a steering angle from the neutral position to a right direction as a positive steering angle, the actual steering angle θs is 15°, and the target steering angle θt is 30°. When the actual steering angle θs is offset by subtracting the target steering angle θt of 30° from the actual steering angle θs of 15°, the actual steering angle θs after the offset is −15° (a steering angle of 15° in a left direction), whereby a steering reaction force torque that tries to return the steering wheel from a position at the steering angle of −15° to the neutral position (the position at the steering angle of 0°) is applied to the steering wheel. This result in application of the steering reaction force torque according to the deviation between the actual steering angle θs and the target steering angle θt. Accordingly, in the present embodiment, by applying a steering reaction force torque according to a value obtained by offsetting (subtraction) the actual steering angle θs by the target steering angle θt, a steering reaction force torque according to the deviation (θt−θs) between the actual steering angle θs and the target steering angle θt is applied to control so that the actual steering angle θs follows the target steering angle θt.

Thus, the first steering reaction force torque Tr1 is the restoring torque that is generated to work in the direction of returning the steering wheel 31a to the neutral position in response to the driver's steering operation with respect to the steer-by-wire type wheel-turning mechanism, and is generated not only during automatic steering control but also even when the automatic steering is not performed (for example, during manual driving).

Accordingly, the magnitude of the first steering reaction force torque Tr1 is set to a magnitude that does not interfere with a steering operation by the driver (a magnitude that allows the driver to easily perform a steering operation).

On the other hand, in the automatic steering control, when the actual steering angle θs is caused to follow the target steering angle θt only by the first steering reaction force torque Tr1, follow-up responsiveness of the actual steering angle θs becomes insufficient, as a result of which responsiveness of the wheel-turning angle of the steered wheels (the left and right front wheels 34FL and 34FR) that are turned according to the actual steering angle θs may become insufficient.

Therefore, during automatic steering control, the reaction force control unit 37 adds the second steering reaction force torque Tr2 that improves the follow-up responsiveness of the actual steering angle θs to the first steering reaction force torque Tr1 to calculate the command steering torque Tr=Tr1+Tr2.

Figure 3C:
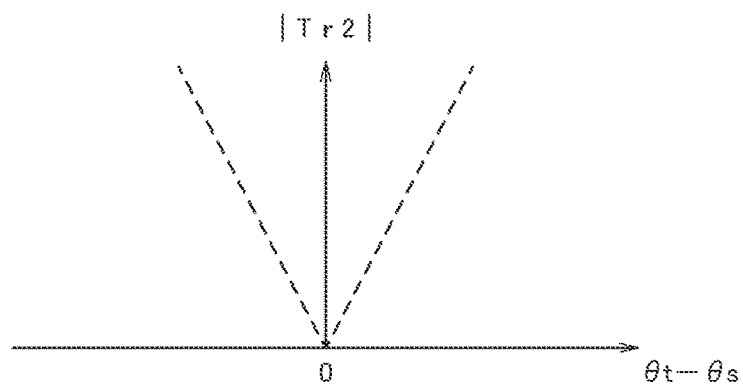
FIG. 3C is an illustrative diagram of a second steering reaction force torque Tr2.

Refer to FIG. 3C. The reaction force control unit 37 calculates, as the second steering reaction force torque Tr2, a reaction force torque according to the angle deviation ($\theta t-\theta s$) between the actual steering angle $\theta s$ and the target steering angle $\theta t$.

Figure 3D:
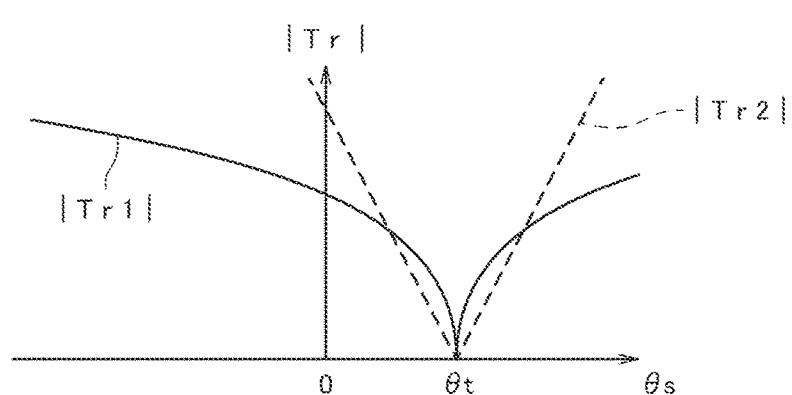
FIG. 3D is an illustrative diagram of a command steering torque Tr.

Refer to FIG. 3D. The command steering torque Tr is a sum of the first steering reaction force torque Tr1 indicated by a solid line and the second steering reaction force torque Tr2 indicated by a dashed line.

In order to improve the follow-up responsiveness of the actual steering angle $\theta s$, the reaction force control unit 37 may calculate the second steering reaction force torque Tr2 that contains a transient component of the angle deviation ($\theta t-\theta s$). The transient component is, for example, a velocity component (a first-order differential value) of the angle deviation ($\theta t-\theta s$).

However, when the second steering reaction force torque Tr2 as described above is applied to the steering wheel 31*a*, it becomes an excessive steering reaction force for the driver, and interferes with a steering operation by the driver. In other words, in the automatic steering control, increasing the steering reaction force in order to obtain sufficient follow-up responsiveness of the actual steering angle $\theta s$ with respect to the target steering angle $\theta t$ interferes with a steering operation by the driver, whereas reducing the steering reaction force torque in order to facilitate the steering operation by the driver makes it difficult to obtain sufficient follow-up responsiveness of the actual steering angle $\theta s$ with respect to the target steering angle $\theta t$.

Therefore, when the steering operation of the steering wheel 31*a* by the driver is detected during the automatic steering control, the reaction force control unit 37 reduces the command steering torque Tr (i.e., the steering reaction force according to the angle deviation) compared with when the steering operation is not detected. This allows for obtaining sufficient follow-up responsiveness of the actual steering angle $\theta s$ with respect to the target steering angle $\theta t$, and facilitates a steering operation by the driver, during the automatic steering control.

The reaction force control unit 37 may reduce both or one of the first steering reaction force torque Tr1 and the second steering reaction force torque Tr2 when the steering operation by the driver is detected.

However, reducing the first steering reaction force torque Tr1 makes the steering reaction force different from the steering reaction force during manual driving, which may cause discomfort to the driver.

Additionally, it is possible to reduce the amount of offset by the target steering angle $\theta t$ (i.e., reduce the deviation between the actual steering angle $\theta s$ and the target steering angle $\theta s$) to reduce the steering reaction force torque that directs the actual steering angle $\theta s$ toward the target steering angle $\theta t$, but it would make it difficult for the host vehicle to travel along the target travel trajectory thereof.

Figure 4:
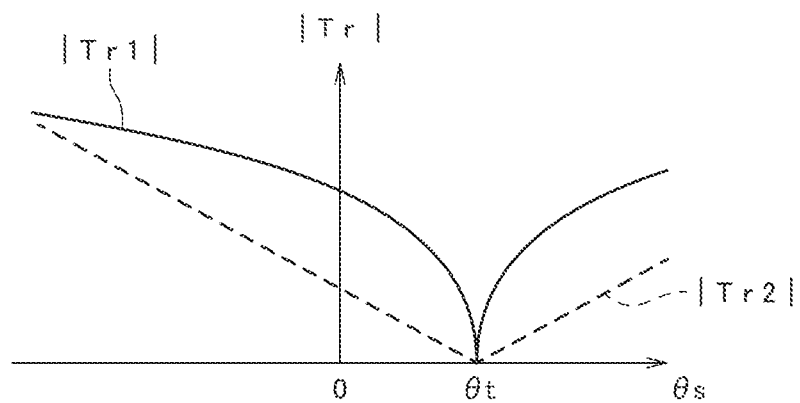
FIG. 4 is an illustrative diagram of the first steering reaction force torque Tr1 and the second steering reaction force torque Tr2 when a steering operation by a driver is detected.

Therefore, as illustrated in FIG. 4, when a steering operation by the driver is detected, the reaction force control unit 37 of the present embodiment reduces only the second steering reaction force torque Tr2 compared with when the steering operation is not detected.

Furthermore, even when the steering operation is detected, the first steering reaction force torque Tr1 when the steering operation is not detected is maintained.

Figure 5:
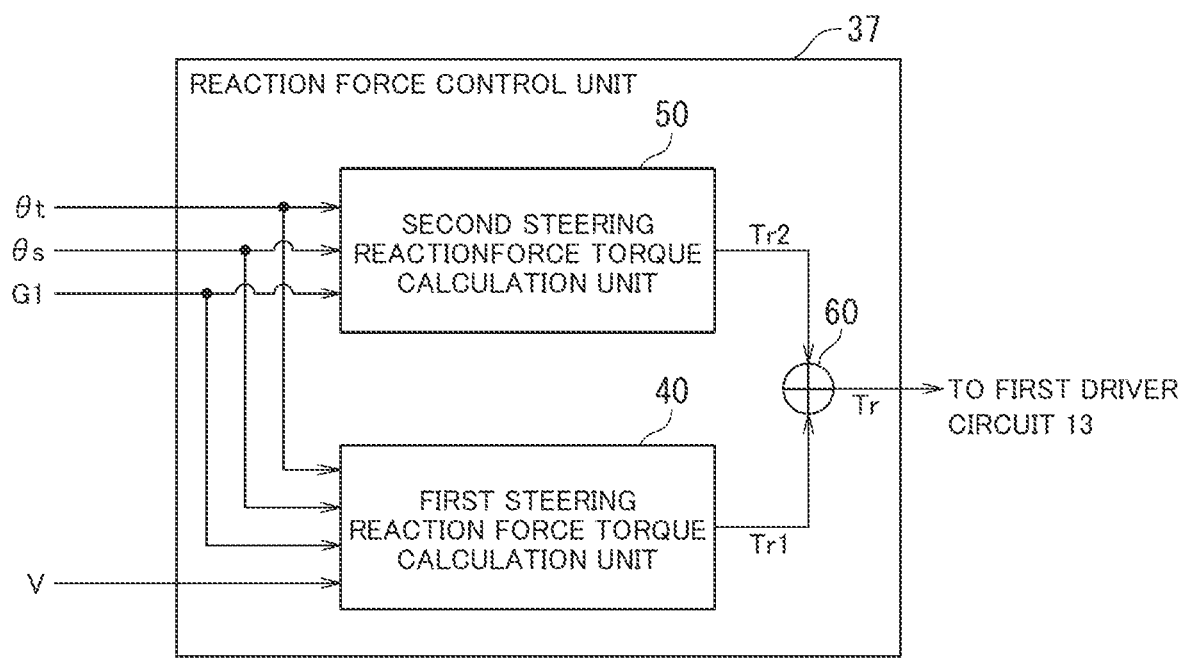
FIG. 5 is a block diagram illustrating a configuration example of a reaction force control unit of FIG. 2.

Hereinafter, the reaction force control unit 37 will be described in detail. Refer to FIG. 5. The reaction force control unit 37 includes a first steering reaction force torque calculation unit 40, a second steering reaction force torque calculation unit 50, and an adder 60.

The first steering reaction force torque calculation unit 40 calculates the first steering reaction force torque Tr1 on the basis of the actual steering angle $\theta s$, the target steering angle $\theta t$, the vehicle speed V, and a first control gain G1 generated by the travel controller 8.

The second steering reaction force torque calculation unit 50 calculates the second steering reaction force torque Tr2 on the basis of the actual steering angle $\theta s$, the target steering angle $\theta t$, and the first control gain G1.

The adder 60 adds the first steering reaction force torque Tr1 and the second steering reaction force torque Tr2 to calculate the command steering torque Tr, and outputs it to the first driver circuit 13.

The first control gain G1 is a gain that controls the amount of offset by the target steering angle $\theta t$ when calculating the first steering reaction force torque Tr1 and the magnitude of the second steering reaction force torque Tr2.

The travel controller 8 determines the magnitude of the first control gain G1 depending on whether automatic steering control is on or off, whether a steering operation by the driver is detected or not, and reliability of the automatic steering control.

The first control gain G1 has a value within a range of from a minimum value of "0" to a maximum value of "1". When the automatic steering control is off, the first control gain G1 is set to "0", and the amount of offset of the actual steering angle $\theta s$ when calculating the first steering reaction force torque Tr1 and the second steering reaction force torque Tr2 become "0", so that the automatic steering control by the travel controller 8 does not work. Accordingly, when the automatic steering control is off, the actual steering angle $\theta s$ is not offset, and the first steering reaction force torque Tr1 calculated by the first steering reaction force torque calculation unit 40 according to a deviation between the steering angle when the host vehicle travels straight ahead (i.e., the steering angle of 0°) and the actual steering angle $\theta s$ and the vehicle speed V is applied to the steering wheel 31*a*.

Figure 6A:
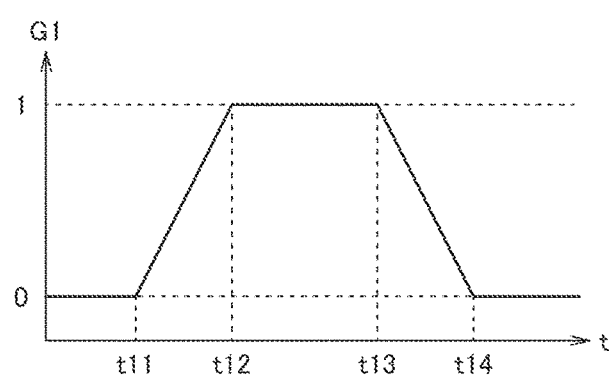
FIG. 6A is an illustrative diagram of changes in a first control gain G1 when the automatic steering control is turned on and off.

Refer to FIG. 6A. When the driver turns on the automatic steering control at time point t11, the travel controller 8 gradually increases the first control gain G1 from "0" to "1" from time point t11 to time point t12.

On the other hand, when the driver or the travel controller 8 turns off the automatic steering control at time point t13, the travel controller 8 gradually decreases the first control gain G1 from "1" to "0" from time point t13 to time point t14.

Figure 6B:
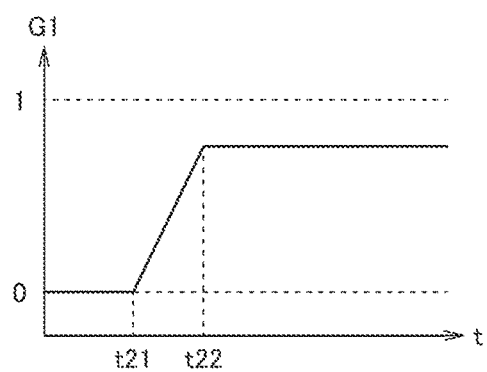
FIG. 6B is an illustrative diagram of a first example of the first control gain G1 when reliability of the automatic steering control is low.

Refer to FIG. 6B. When the automatic steering control is on, the travel controller 8 calculates the reliability of the automatic steering control, and determines the magnitude of the first control gain G1 according to the reliability of the automatic steering control.

The travel controller 8 calculates the reliability of the automatic steering control, for example, on the basis of the surrounding environment of the host vehicle detected by the external sensor 2, the traveling state of the host vehicle detected by the internal sensor 3, health of the external sensor 2 and the internal sensor 3, traveling scenes, a climate, time points, and the like.

For example, when the driver turns on the automatic steering control at time point t21 but the reliability of the automatic steering control is lower than a predetermined acceptable value, the travel controller 8 outputs the first control gain G1 that is smaller than the maximum value of "1" and according to the level of the reliability of the automatic steering control, at time point t22.

Figure 6C:
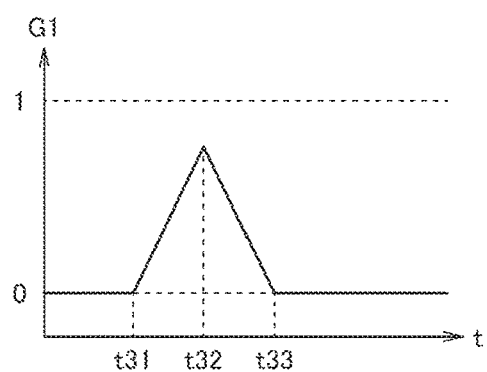
FIG. 6C is an illustrative diagram of a second example of the first control gain G1 when the reliability of the automatic steering control is low.

Refer to FIG. 6C. For example, when the driver turns on the automatic steering control at time point t31 but the reliability of the automatic steering control is lower than the predetermined acceptable value, the travel controller 8 may stop the automatic steering control, reduce the first control gain G1 at time point t32, and return it to the minimum value of "0" at time point t33.

Figure 6D:
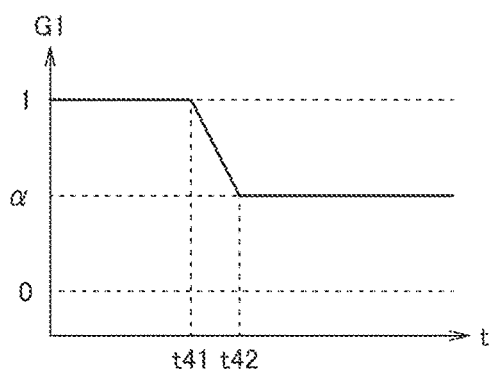
FIG. 6D is an illustrative diagram of a change in the first control gain G1 when a steering operation by the driver is detected.

Refer to FIG. 6D. When the automatic steering control is on, the travel controller 8 detects the steering operation of the steering wheel 31a by the driver (i.e., detects whether or not the driver is steering the steering wheel 31a), and reduces the first control gain G1 to a value of "α" that is smaller than the maximum value of "1" when the steering operation is detected.

For example, the travel controller 8 calculates a steering torque applied by the driver on the basis of an output torque of the reaction force actuator 12 to detect a steering operation by the driver. In other words, it is possible to detect a steering operation by the driver on the basis of a change in the steering angle of the steering wheel with respect to the output torque of the reaction force actuator 12. Note that the detection of a steering operation by the driver is not limited thereto. For example, it is also possible to provide a torque sensor that directly detects a steering torque input to the steering wheel by the driver and use a detection value of the torque sensor to detect the steering operation by the driver, and therefore a well-known method can be applied as appropriate to detect a steering operation by the driver.

Now, suppose that when the state where a steering operation by the driver is not detected changes to the state where the steering operation by the driver is detected, the travel controller 8 detects the steering operation by the driver at time point t41.

The travel controller 8 gradually decreases the first control gain G1 from "1" to "α" from time point t41 to time point t42.

Figure 7:
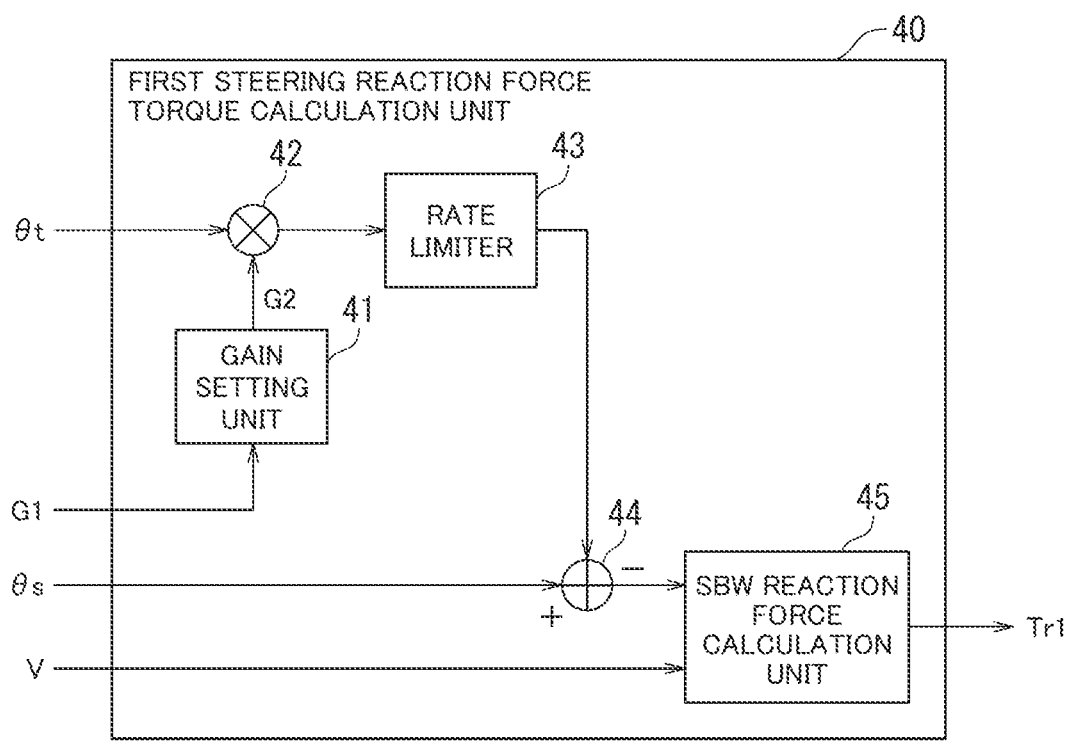
FIG. 7 is a block diagram illustrating a configuration example of a first steering reaction force torque calculation unit.

Refer to FIG. 7. The first steering reaction force torque calculation unit 40 includes a gain setting unit 41, a multiplier 42, a rate limiter 43, a subtractor 44, and a steer-by-wire (SBW) reaction force calculation unit 45.

The gain setting unit 41 sets a second control gain G2 on the basis of the first control gain G1. The second control gain G2 is a gain that controls the amount of offset of the actual steering angle θs by the target steering angle θt, and is multiplied by the target steering angle θt by the multiplier 42.

A product (G2×θt) of the second control gain G2 and the target steering angle θt is input to the subtractor 44 after the rate of change is limited by the rate limiter 43.

The subtractor 44 offsets the actual steering angle θs by the target steering angle θt(G2×θt) multiplied by the second control gain G2.

The steer-by-wire reaction force calculation unit 45 calculates, as the first steering reaction force torque Tr1, a steering reaction force based on the offset actual steering angle θs and the vehicle speed V.

The second control gain G2 has a value in the range of from the minimum value of "0" to the maximum value of "1". When the second control gain G2 is "0", the amount of offset of the actual steering angle θs when calculating the first steering reaction force torque Tr1 becomes "0". When the second control gain G2 is "1", the amount of offset thereof becomes equal to the target steering angle θt.

When the first control gain G1 increases from a state where both the first and second control gains G1 and G2 are "0", the gain setting unit 41 sets the second control gain G2 to the same value as the first control gain G1, and increases the second control gain G2 together with the first control gain G1.

Figure 8A:
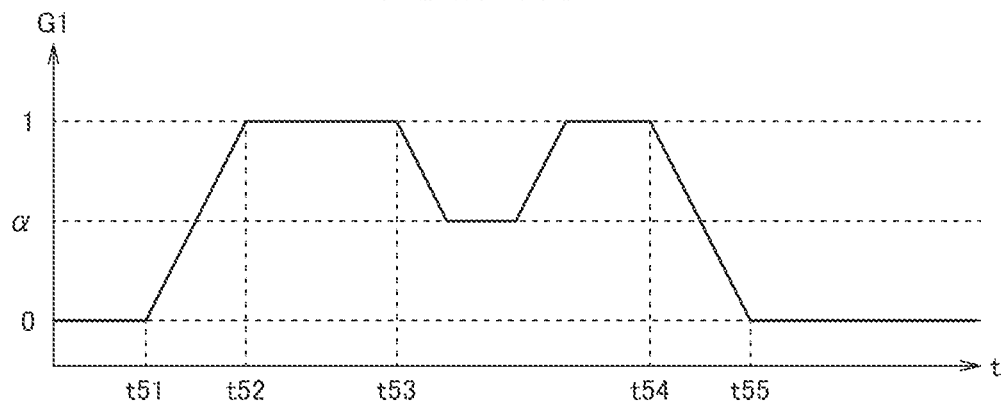
FIG. 8A is an illustrative diagram of changes in the first control gain G1 when the automatic steering control is turned on and off and when a steering operation by the driver is detected.
Figure 8B:
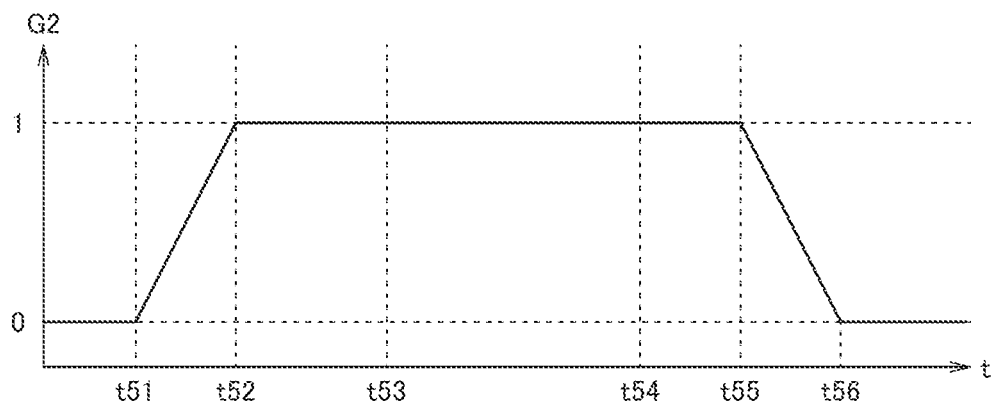
FIG. 8B is an illustrative diagram of a change in a second control gain G2 according to the first control gain G1 of FIG. 8A.

Refer to FIGS. 8A and 8B. For example, when the driver turns on the automatic steering control at time point t51 and the first control gain G1 increases from the state where both the first and second control gains G1 and G2 are "0", the gain setting unit 41 sets the second control gain G2 to the same value as the first control gain G1, and increases the second control gain G2 together with the first control gain G1.

After that, when the first and second control gains G1 and G2 become "1", the gain setting unit 41 changes the value of an automatic steering flag FLG from "0" to "1".

The value of "1" in the automatic steering flag FLG indicates that the first control gain G1 has not yet reached "0" after reaching "1".

On the contrary, the value "0" of the automatic steering flag FLG indicates that the first control gain G1 has not yet reached "1" after reaching "0".

In examples of FIGS. 8A and 8B, the first and second control gains G1 and G2 become "1" at time point t52, and the value of the automatic steering flag FLG changes from "0" to "1".

While the value of the automatic steering flag FLG is "1", i.e., in the period when the first control gain G1 has not yet reached "0" after reaching "1", the gain setting unit 41 maintains the second control gain G2 at "1" even when the first control gain G1 is smaller than "1".

In the examples of FIGS. 8A and 8B, the travel controller 8 detects a steering operation by the driver at time point t53, and reduces the first control gain G1 to "α" smaller than "1".

The gain setting unit 41 maintains the second control gain G2 at "1" even when the first control gain G1 becomes smaller than "1".

Therefore, when a steering operation by the driver is detected during the automatic steering, the amount of offset of the actual steering angle θs is maintained at a value when the steering operation by the driver is not detected (the target steering angle θt).

When the first control gain G1 reaches "0", the gain setting unit 41 changes the value of the automatic steering flag FLG from "1" to "0". In the period when the value of the automatic steering flag FLG is "0", the gain setting unit 41 gradually decreases the second control gain G2 when the second control gain G2 is larger than the first control gain G1, and matches the second control gain G2 with the first control gain G1.

In the examples of FIGS. 8A and 8B, when the driver or the travel controller 8 turns off the automatic steering control at time point t54, the first control gain G1 decreases and reaches "0" at time point t55.

Then, the value of the automatic steering flag FLG changes from "1" to "0", the second control gain G2 starts to decrease, reaches "0" at time point t56, and becomes equal to the first control gain G1. As a result, the amount of offset of the actual steering angle θs is reduced to "0" when the automatic steering control transitions from on to off.

As described above, when the reliability of the automatic steering control is lower than the predetermined acceptable value, the value of the first control gain G1 is smaller than "1", and does not reach "1" from "0" even when the automatic steering control is turned on. In this case, the value of the automatic steering flag FLG becomes "0". Accordingly, when the value of the automatic steering flag FLG is "0", the reliability of the automatic steering control may be lower than the acceptable value, and the target steering angle θt may be inaccurate.

Accordingly, in this case, the second control gain G2 is set equal to the first control gain G1 according to the reliability of the automatic steering control. This prevents the amount of offset of the actual steering angle θs when calculating the first steering reaction force torque Tr1 from becoming excessively large.

Figure 9A:
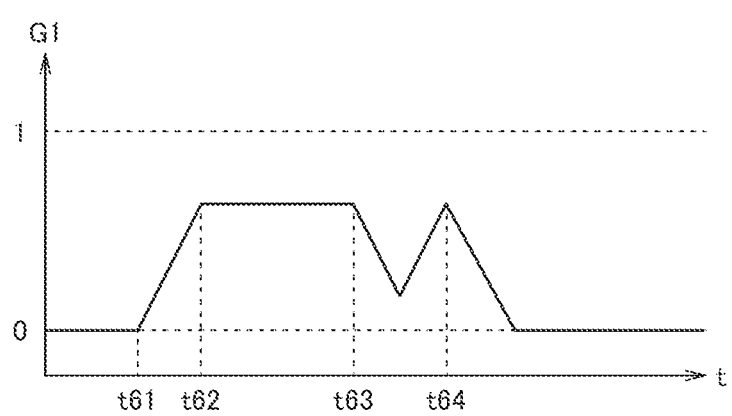
FIG. 9A is an illustrative diagram of a third example of the first control gain G1 when the reliability of the automatic steering control is low.
Figure 9B:
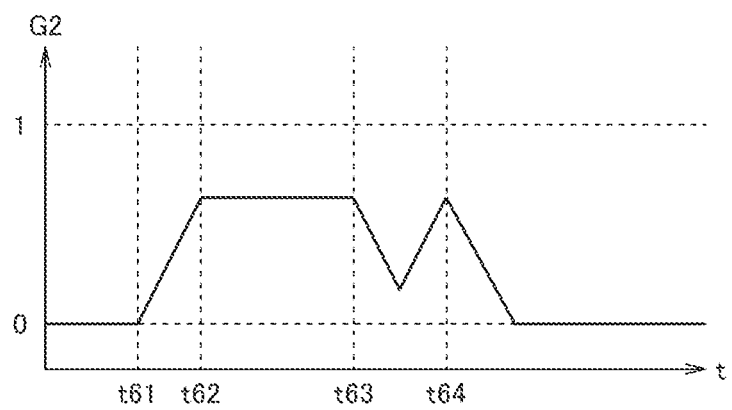
FIG. 9B is an illustrative diagram of a change in a second control gain G2 according to the first control gain G1 of FIG. 9A.

For example, as illustrated in FIGS. 9A and 9B, when the driver turns on the automatic steering control at time point t61 but the first control gain G1 does not reach "1" due to the low reliability of the automatic steering control, the second control gain G2 is set according to the first control gain G1 set by the travel controller 8.

Figure 10A:
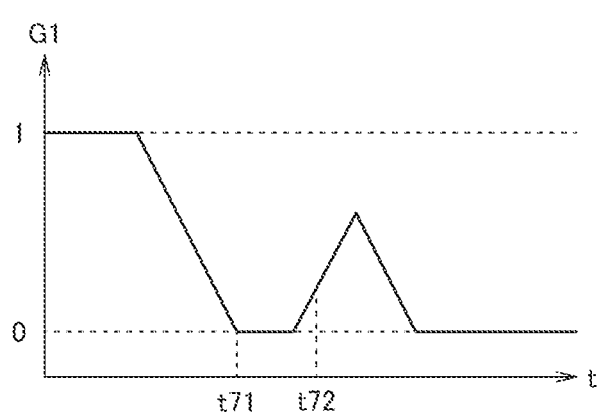
FIG. 10A is an illustrative diagram of changes in the first control gain G1 when the automatic steering control is turned off and then turned on and the reliability of the automatic steering control is determined to be low.
Figure 10B:
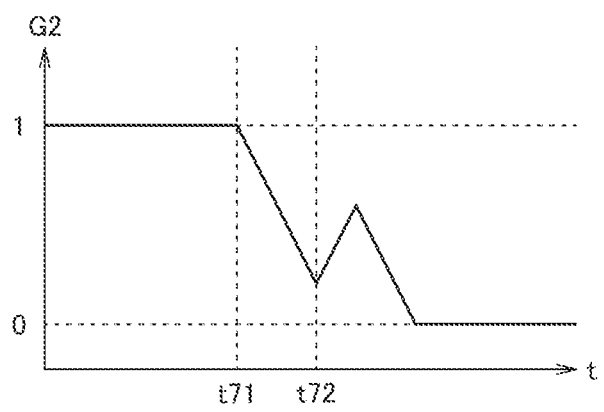
FIG. 10B is an illustrative diagram of changes in the second control gain G2 according to the first control gain G1 of FIG. 10A.

FIGS. 10A and 10B illustrate one example of a change in the second control gain G2 after the value of the automatic steering flag FLG changes from "1" to "0".

When the driver or the travel controller 8 turns off the automatic steering control and the first control gain G1 reaches "0" at time point t71, the value of the automatic steering flag FLG changes from "1" to "0" and the second control gain G2 starts to decrease. In a period from time point t71 to time point t72, the second control gain G2 is larger than the first control gain G1, so that the second control gain G2 continues to decrease.

Then, the automatic steering control is turned on and the first control gain G1 starts to increase, and after the second control gain G2 becomes equal to the first control gain G1 at time point t72, the second control gain G2 and the first control gain G1 are equal until the first control gain G1 reaches "1".

Figure 11:
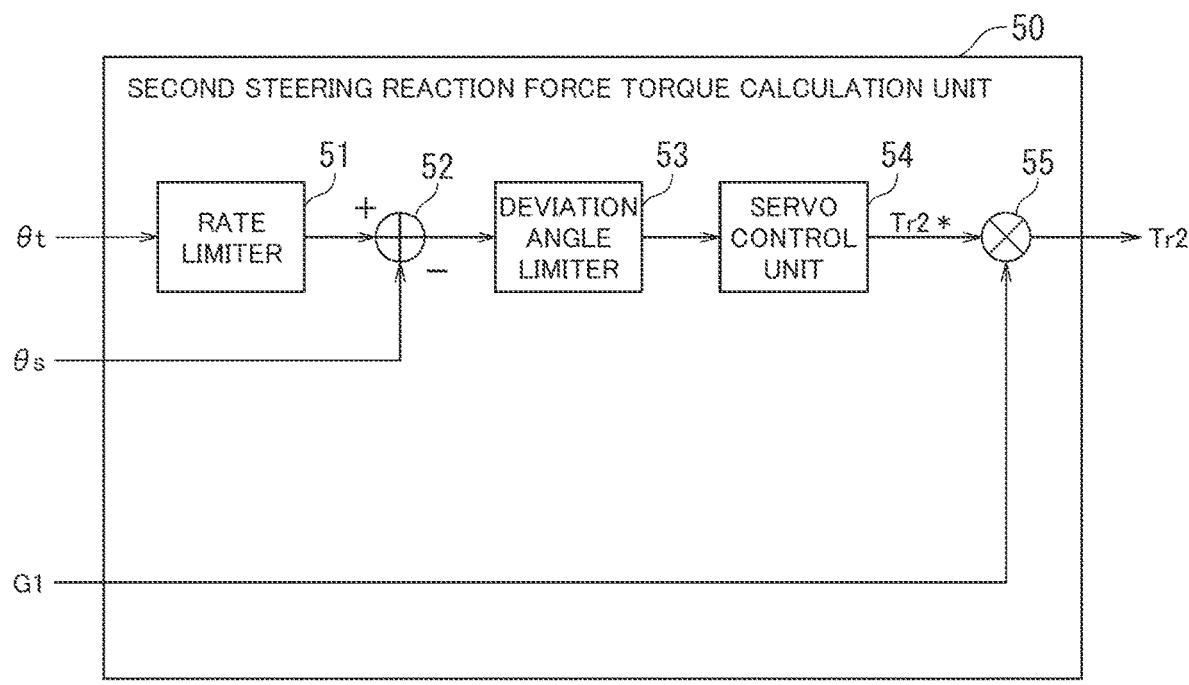
FIG. 11 is a block diagram illustrating a configuration example of a second steering reaction force torque calculation unit.

Refer to FIG. 11. The second steering reaction force torque calculation unit 50 includes a rate limiter 51, a subtractor 52, a deviation angle limiter 53, a servo control unit 54, and a multiplier 55.

The target steering angle θt is input to the subtractor 52 after the rate of change is limited by the rate limiter 51. The subtractor 52 calculates an angle deviation (θt−θs) between the target steering angle θt and the actual steering angle θs. The deviation angle limiter 53 limits upper and lower limit values of the angle deviation (θt−θs).

The servo control unit 54 calculates a rotation torque Tr2* that causes the actual steering angle θs to follow the target steering angle θt by servo control based on the angle deviation (θt−θs).

The servo control unit 54 may calculate the rotation torque Tr2* that contains the transient component of the angle deviation (θt−θs). This allows for improved follow-up responsiveness of the actual steering angle θs. For example, the servo control unit 54 may calculate the rotation torque Tr2* by PD servo control (proportional-derivative servo control). In other words, the rotation torque Tr2* may contain proportional and differential components of the angle deviation (θt−θs).

The multiplier 55 calculates, as the second steering reaction force torque Tr2, a product (G1×Tr2*) of the rotation torque Tr2* multiplied by the first control gain G1.

Therefore, when the automatic steering control transitions from on to off and the first control gain G1 decreases to "0", the second steering reaction force torque Tr2 is reduced to "0" according to the first control gain G1.

Additionally, when the first control gain G1 decreases to "α" when a steering operation by the driver is detected, the second steering reaction force torque Tr2 is reduced according to the first control gain G1 compared with when the steering operation is not detected.

(Operation)

Figure 12:
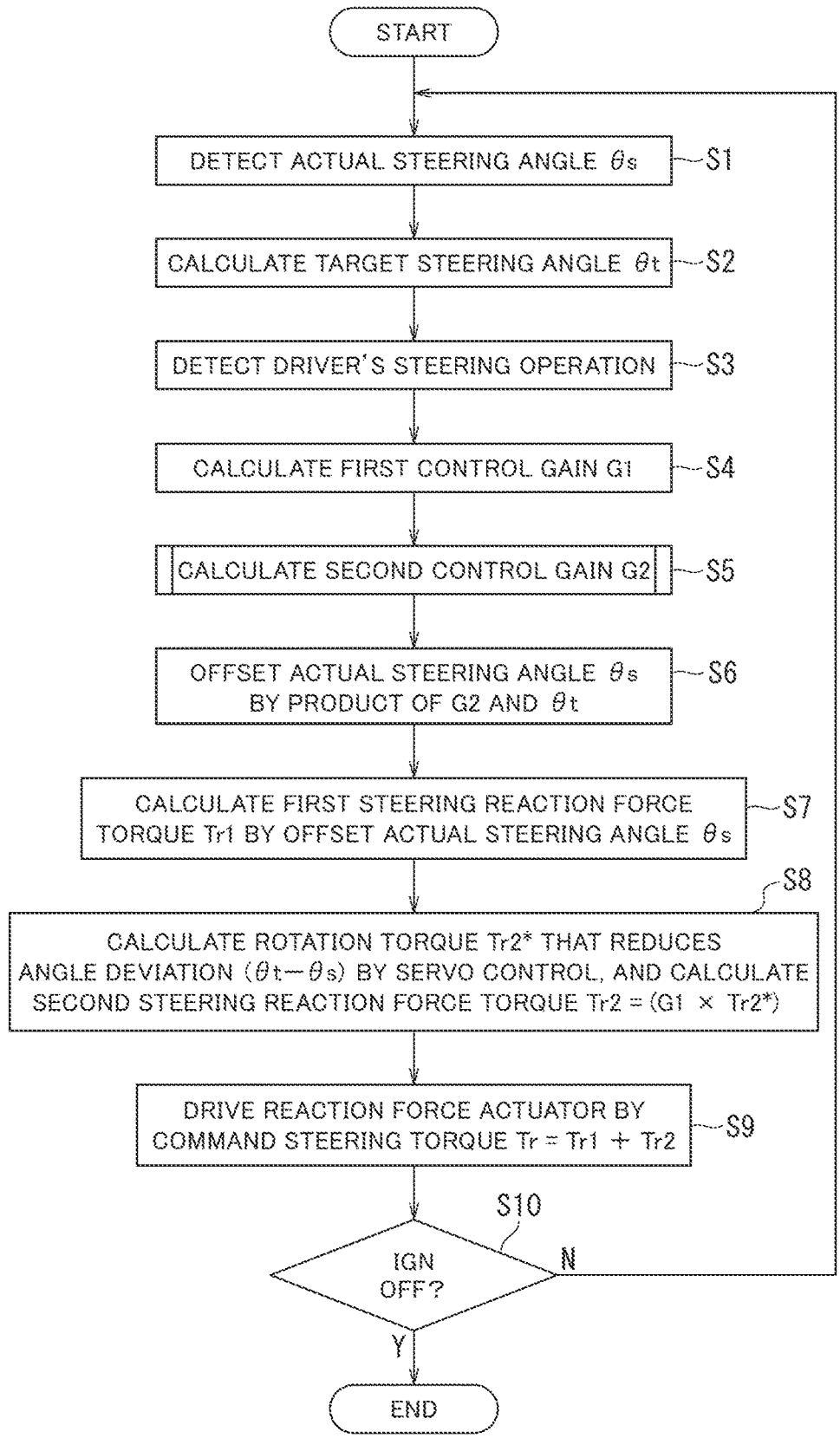
FIG. 12 is a flowchart of one example of a steering control method of an embodiment.

Next, one example of a steering control method of an embodiment will be described with reference to FIG. 12.

At step S1, the steering angle sensor 19 detects the actual steering angle θs of the steering wheel 31a.

At step S2, the travel controller 8 calculates the target steering angle θt for allowing the host vehicle to travel along a target travel trajectory.

At step S3, the travel controller 8 detects a steering operation by the driver.

At step S4, the travel controller 8 calculates the first control gain G1.

As described above, the first control gain G1 when the steering operation by the driver is detected is set to the value of "α" smaller than the value of "1" when the steering operation is not detected. Additionally, when the automatic steering control transitions from on to off, the first control gain G1 decreases from "1" to "0".

At step S5, the gain setting unit 41 of the first steering reaction force torque calculation unit 40 calculates the second control gain G2 on the basis of the first control gain G1. A second control gain G2 calculation routine will be described later with reference to FIG. 13.

As described above, the second control gain G2 when the steering operation by the driver is detected is maintained at the value of "1" when the steering operation is not detected. Additionally, when the automatic steering control transitions from on to off, the second control gain G2 decreases from "1" to "0".

At step S6, the multiplier 42 and the subtractor 44 offset the actual steering angle θs by the product (G2×θt) of the second control gain G2 and the target steering angle θt.

At step S7, the steer-by-wire reaction force calculation unit 45 calculates the first steering reaction force torque Tr1 on the basis of the offset actual steering angle θs and the vehicle speed V.

At step S8, the servo control unit 54 calculates the rotation torque Tr2* that reduces the angle deviation (θt−θs), by servo control. The multiplier 55 calculates, as the second steering reaction force torque Tr2, the product (G1×Tr2*) of the rotation torque Tr2* multiplied by the first control gain G1.

At step S9, the first driver circuit 13 drives the reaction force actuator 12 by the command steering torque Tr=Tr1+Tr2.

At step S10, the controller 11 determines whether an ignition switch (IGN) of the host vehicle is off or not. When the ignition switch is not off (step S10: N), processing returns to step S1. When the ignition switch is off (step S10: Y), processing ends.

Figure 13:
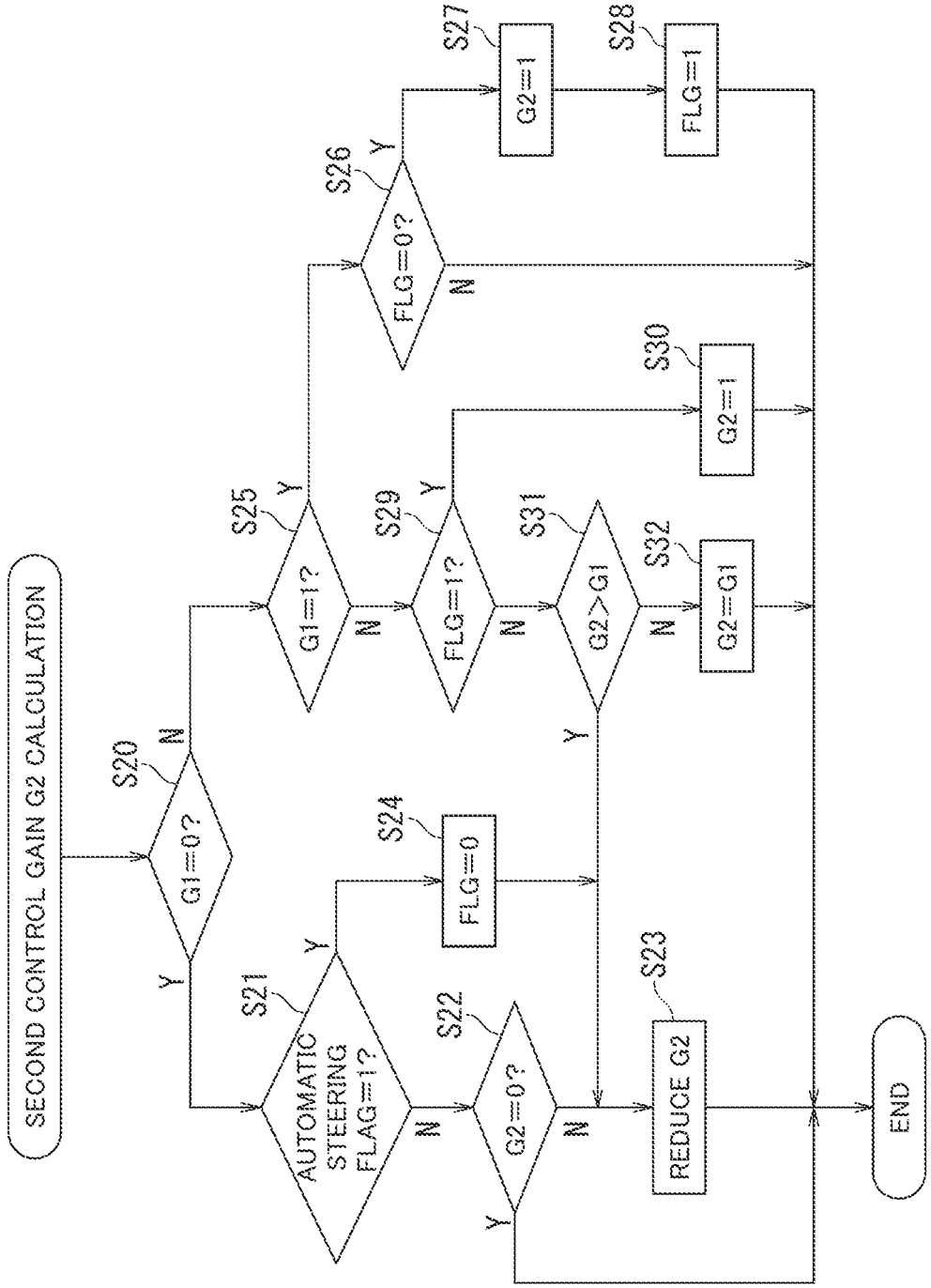
FIG. 13 is a flowchart of one example of a second control gain G2 calculation routine.

Next, the second control gain G2 calculation routine by the gain setting unit 41 will be described with reference to FIG. 13.

At step S20, the gain setting unit 41 determines whether the first control gain G1 is "0" or not. When the first control gain G1 is "0" (step S20: Y), processing proceeds to step S21. When the first control gain G1 is not "0" (step S20: N), processing proceeds to step S25.

At step S21, the gain setting unit 41 determines whether a current value of the automatic steering flag FLG is "1" or not. When the value of the automatic steering flag FLG is "1" (step S21: Y), it means that the first control gain G1 has changed from a state of not being "0" to "0". In this case, processing proceeds to step S24. When the value of the automatic steering flag FLG is not "1" (step S21: N), processing proceeds to step S22.

At step S22, the gain setting unit 41 determines whether a previous second control gain G2 is "0" or not. When the second control gain G2 is "0" (step S22: Y), the second control gain G2 is not changed, and the second control gain G2 calculation routine is ended. When the second control gain G2 is not "0" (step S22: N), processing proceeds to step S23.

At step S23, the gain setting unit 41 reduces the second control gain G2. After that, the second control gain G2 calculation routine is ended.

At step S24, the gain setting unit 41 sets the value of the automatic steering flag FLG to "0". After that, processing proceeds to step S23, the second control gain G2 is set to a value reduced from the previous value of "1". Then, the second control gain G2 calculation routine is ended.

When the first control gain G1 is not "0" (step S20: N), the gain setting unit 41 determines at step S25 whether the first control gain G1 is "1" or not. When the first control gain G1 is "1" (step S25: Y), processing proceeds to step S26. When the first control gain G1 is not "1" (step S25: N), processing proceeds to step S29.

At step S26, the gain setting unit 41 determines whether the current value of the automatic steering flag FLG is "0" or not. When the value of the automatic steering flag FLG is "0" (step S26: Y), it means that the first control gain G1 has changed from the state of not being "1" to "1". In this case, processing proceeds to step S27. At step S27, the gain setting unit 41 sets the value of the second control gain G2 to "1".

At step S28, the gain setting unit 41 sets the value of the automatic steering flag FLG to "1". Then, the second control gain G2 calculation routine is ended.

On the other hand, at step S26, when the value of the automatic steering flag FLG is not "0" (step S26: N), the second control gain G2 is not changed from the previous value of "1", and the second control gain G2 calculation routine is ended.

At step S29, the gain setting unit 41 determines whether the current value of the automatic steering flag FLG is "1" or not. When the value of the automatic steering flag FLG is "1" (step S29: Y), it means that the first control gain G1 has not yet reached "0" after becoming "1". In this case, processing proceeds to step S30. When the value of the automatic steering flag FLG is not "1" (step S29: N), processing proceeds to step S31.

At step S30, the gain setting unit 41 maintains the second control gain G2 at "1". Then, the second control gain G2 calculation routine is ended.

At step S31, the gain setting unit 41 determines whether the second control gain G2 is larger than the first control gain G1 or not. When the second control gain G2 is larger than the first control gain G1 (step S31: Y), processing proceeds to step S23. When the second control gain G2 is not larger than the first control gain G1 (step S31: N), processing proceeds to step S32.

At step S32, the gain setting unit 41 sets the second control gain G2 to the same value of "1" as that of the first control gain G1. Then, the second control gain G2 calculation routine is ended.

Effects of Embodiment (1) The host vehicle includes the steer-by-wire type wheel-turning mechanism in which the steering wheel 31*a* and the steered wheels are mechanically disconnected. The steering angle sensor 19 detects the actual steering angle $\theta s$ of the steering wheel. The travel controller 8 calculates the target steering angle of the steering wheel on the basis of the target wheel-turning angle of the steered wheels. The reaction force control unit 47, the first driver circuit 13, and the reaction force actuator 12 apply a steering reaction force to the steering wheel according to the angle deviation ($\theta t-\theta s$) between the actual steering angle $\theta s$ and the target steering angle $\theta t$. The travel controller 8 detects the steering operation of the steering wheel 31*a* by the driver. When the steering operation by the driver is detected, the reaction force control unit 47 reduces the steering reaction force according to the angle deviation compared with when the steering operation by the driver is not detected.

As a result, when the steering operation by the driver is not detected, a relatively large steering reaction force is applied to the steering wheel 31*a* to improve the follow-up responsiveness of the actual steering angle $\theta s$ with respect to the target steering angle $\theta t$ in the automatic steering control. Additionally, when the steering operation by the driver is detected, the steering reaction force is reduced so as not to interfere with the steering operation, which can facilitate the steering operation by the driver.

(2) The reaction force control unit 47, the first driver circuit 13, and the reaction force actuator 12 adds the first steering reaction force Tr1 according to the angle deviation ($\theta t-\theta s$) and the second steering reaction force Tr2 containing the transient component of the angle deviation ($\theta t-\theta s$) to generate the steering reaction force to be applied to the steering wheel 31*a*. When the steering operation by the driver is detected, the reaction force control unit 47 reduces only the second steering reaction force Tr2 compared with when the steering operation by the driver is not detected.

As a result, adding the second steering reaction force Tr2 containing the transient component of the angle deviation ($\theta t-\theta s$) can improve the follow-up responsiveness of the actual steering angle $\theta s$ in the automatic steering control. Additionally, when the steering operation by the driver is detected, reducing the second steering reaction force Tr2 can facilitate the steering operation by the driver.

(3) When the state where a steering operation by the driver is not detected changes to the state where the steering operation by the driver is detected, the reaction force control unit 47 gradually decreases the second steering reaction force Tr2 according to a time elapsed from a time point when the steering operation by the driver is detected.

This can avoid degradation of steering feeling due to a sudden change in the second steering reaction force Tr2.

(4) The first steering reaction force torque calculation unit 40 offsets the actual steering angle $\theta s$ by the target steering angle $\theta t$, and calculates the first steering reaction force Tr1 according to the offset actual steering angle $\theta s$ to calculate the first steering reaction force Tr1 according to the angle deviation ($\theta t-\theta s$) between the actual steering angle $\theta s$ and the target steering angle $\theta t$. When the automatic steering control transitions from on to off, the first steering reaction force torque calculation unit 40 and the second steering reaction force torque calculation unit 50 reduce the amount of offset of the actual steering angle $\theta s$ and the second steering reaction force Tr2. When a steering operation by the driver is detected during the automatic steering, the first steering reaction force torque calculation unit 40 and the second steering reaction force torque calculation unit 50 reduce the second steering reaction force Tr2, and maintain the amount of offset at the value when the steering operation by the driver is not detected.

As a result, when the steering operation by the driver is detected, the steering operation by the driver can be facilitated while maintaining the steering reaction force that brings the neutral position of the steering wheel 31*a* (the position where the steering reaction force torque is 0) to the target steering angle $\theta t$.

(5) The first steering reaction force torque calculation unit 40 calculates, as the first steering reaction force Tr1, the steering reaction force according to the tire lateral force based on the offset actual steering angle θs and the vehicle speed V of the host vehicle. The second steering reaction force torque calculation unit 50 calculates the second steering reaction force by the proportional-derivative control of the angle deviation (θt−θs).

This allows the driver to feel the steering reaction force according to the tire lateral force, so that the steering feeling of the steer-by-wire type wheel-turning mechanism is improved, and the follow-up responsiveness of the actual steering angle θs with respect to the target steering angle θt in the automatic steering control can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Vehicle control device
2: External sensor
3: Internal sensor
4: Positioning device
5: Map database
6: Communication device
7: Navigation system
8: Travel controller
9: Accelerator position actuator
10: Brake control actuator
11: Controller
12: Reaction force actuator
13: First driver circuit
14: Wheel-turning actuator
15: Second driver circuit
16: Camera
17: Range finder
18: Vehicle speed sensor
19: Steering angle sensor
20: Processor
21: Storage device
31: Steering unit
31a: Steering wheel
31b: Column shaft
31c: Current sensor
32: Wheel-turning unit
32a: Pinion shaft
32b: Steering gear
32c: Rack gear
32d: Steering rack
33: Backup clutch
34FL: Left front wheel
34FR: Right front wheel
35: Wheel-turning angle sensor
36: Wheel-turning control unit
37: Reaction force control unit
40: First steering reaction force torque calculation unit
41: Gain setting unit
42: Multiplier
43: Rate limiter
44: Subtractor
45: Steer-by-wire reaction force calculation unit
47: Reaction force control unit
50: Second steering reaction force torque calculation unit
51: Rate limiter
52: Subtractor
53: Deviation angle limiter
54: Servo control unit
55: Multiplier
60: Adder

The invention claimed is:

1. A steering control method for a vehicle including a steer-by-wire type wheel-turning mechanism in which a steering wheel and steered wheels are mechanically disconnected, the method comprising:
  detecting an actual steering angle of the steering wheel;
  calculating a target steering angle of the steering wheel on a basis of a target wheel-turning angle of the steered wheels;
  applying a steering reaction force to the steering wheel;
  detecting a steering operation of the steering wheel by a driver;
  generating the steering reaction force by adding a first steering reaction force according to an angle deviation between the actual steering angle and the target steering angle and a second steering reaction force containing a transient component of the angle deviation;
  when the steering operation by the driver is detected, reducing only the second steering reaction force compared with when the steering operation by the driver is not detected.

2. The steering control method according to claim 1, wherein when a state where the steering operation by the driver is not detected changes to a state where the steering operation by the driver is detected, the second steering reaction force is gradually reduced according to a time elapsed from a time point when the steering operation by the driver is detected.

3. The steering control method according to claim 2, wherein the actual steering angle is offset by the target steering angle, and the first steering reaction force is calculated according to a value of the offset actual steering angle; and wherein when the steering operation by the driver is detected during automatic steering control, the second steering reaction force is reduced, and an amount of the offset is maintained at a value when the steering operation by the driver is not detected.

4. The steering control method according to claim 3, wherein a steering reaction force according to a tire lateral force based on the offset actual steering angle and a vehicle speed of the vehicle is calculated as the first steering reaction force; and wherein the second steering reaction force is calculated by proportional-derivative control of the angle deviation.

5. A steering control device for a vehicle including a steer-by-wire type wheel-turning mechanism in which a steering wheel and steered wheels are mechanically disconnected, the steering control device comprising:
  a reaction force actuator configured to apply a steering reaction force to the steering wheel;
  a driver circuit configured to drive the reaction force actuator; and
  a controller configured to detect an actual steering angle of the steering wheel, calculate a target steering angle on a basis of a target wheel-turning angle of the steered wheels, and output a control signal configured to cause the reaction force actuator to generate a steering reaction force according to the actual steering angle and the target steering angle to the driver circuit, the controller being configured to:

generate the steering reaction force by adding a first steering reaction force according to an angle deviation between the actual steering angle and the target steering angle and a second steering reaction force containing a transient component of the angle deviation;

when the steering operation by the driver is detected, reduce only the second steering reaction force compared with when the steering operation by the driver is not detected.

* * * * *